US007224696B2

(12) United States Patent
Bouleros et al.

(10) Patent No.: US 7,224,696 B2
(45) Date of Patent: May 29, 2007

(54) ACCESS NODES IN PACKET-BASED COMMUNICATIONS NETWORKS

(75) Inventors: George Bouleros, Bracknell (GB); Julian Mitchell, Miaidenhead (GB)

(73) Assignee: Nortel Networks, Ltd., St. Laurent, Quebec (CA)

( * ) Notice: Subject to any disclaimer, the term of this patent is extended or adjusted under 35 U.S.C. 154(b) by 1061 days.

(21) Appl. No.: 10/165,900

(22) Filed: Jun. 10, 2002

(65) Prior Publication Data

US 2003/0227905 A1    Dec. 11, 2003

(51) Int. Cl.
*H04L 12/28* (2006.01)
*H04L 12/56* (2006.01)
*H04J 3/24* (2006.01)

(52) U.S. Cl. .................. 370/401; 370/392; 370/475
(58) Field of Classification Search ............ 370/389, 370/392, 475, 401, 410
See application file for complete search history.

(56) References Cited

U.S. PATENT DOCUMENTS

| | | | |
|---|---|---|---|
| 6,650,641 B1* | 11/2003 | Albert et al. ............ 370/392 |
| 7,006,436 B1* | 2/2006 | Chu et al. ............... 370/230 |
| 2002/0093945 A1* | 7/2002 | Vesterinen ............. 370/352 |
| 2002/0159447 A1* | 10/2002 | Carey et al. ........... 370/389 |
| 2003/0063623 A1* | 4/2003 | Leslie et al. ........... 370/466 |
| 2003/0202521 A1* | 10/2003 | Havinis et al. ........ 370/401 |
| 2004/0017818 A1* | 1/2004 | Chung ................... 370/401 |
| 2004/0052216 A1* | 3/2004 | Roh ....................... 370/252 |
| 2005/0223095 A1* | 10/2005 | Voiz et al. ............. 709/225 |

* cited by examiner

*Primary Examiner*—Wing Chan
*Assistant Examiner*—Warner Wong
(74) *Attorney, Agent, or Firm*—Barnes & Thornburg, LLP

(57) ABSTRACT

There is an increasing need for many media gateway nodes to be used in enterprise networks. These media gateway nodes are typically connected behind a network address translator (NAT) which connects the enterprise network to a public communications network. Communication between the access nodes and a service provider network, which is also connected to the public network, is needed to provide communications services to end users. However, as the number of media gateways increases problems arise associated with increased traffic, complexity and use of resources at the NAT and at the service provider network. A solution is presented whereby a node is used to represent the media gateway nodes in the enterprise network.

16 Claims, 7 Drawing Sheets

ACCESS NODES IN PACKET-BASED COMMUNICATIONS NETWORKS

FIELD OF THE INVENTION

The present invention relates to situations involving a plurality of access nodes in a private packet-based communications network. The invention is particularly related to but in no way limited to voice over internet protocol communications networks.

BACKGROUND TO THE INVENTION

Packet-based communications networks typically comprise several different address domains. For example, a particular company or enterprise may have its own network which is connected to another network such as the Internet. This is illustrated in FIG. 1, which is introduced for explanatory and informative purposes, which shows a network 10 of a first enterprise connected to a common network 11. Other enterprises may also have networks connected to the common network 11, such as enterprise 2 and its network 12 in FIG. 1. These different networks 10, 11, 12 typically each use a particular addressing scheme and number of addresses, one for each node within that network. Thus each network is an address domain.

The address domains may or may not overlap; that is, for two overlapping address domains, at least some of the addresses occur in both domains. In addition, an address domain may be either public or private with respect to other address domains. In the example shown in FIG. 1 an enterprise network 10 is private with respect to common network 11. That is, addresses of nodes within enterprise network 10 are not known to nodes within common network 11. However, common network 11 is public with respect to enterprise network 10. That is, addresses of nodes in common network 11 are known to nodes within enterprise network 10.

As is known in the art, address domains are connected via address translation nodes which act to associate or "translate" the address of an item in one domain into an address that is functional within another address domain. For example, one particular type of address translation node is a network address translator (NAT). Another example is a network address and port translator (NAPT). Both NATs and NAPTs are defined by the Internet Engineering Task Force (IETF) in RFC 3022.

Consider a situation in which a service provider wishes to provide voice over internet protocol or other similar services to enterprise 1. This is typically achieved using a control node (e.g. MGC1 in FIG. 1) which is part of the service provider's own network connected to the common network 11 via an address translation node 14. For example, consider an entity connected to enterprise network 1 via node MG1. This entity requires to set up a call, say a voice call, between itself and another entity connected to enterprise network 2 via node MG2. In order to achieve this a request is sent to the control node MGC1 which uses control signalling messages to set up a call path in each direction between the two entities. Once this has been set up, actual media packets can be sent between the two entities to carry out the call.

The nodes MG1 and MG2 are media gateways or any other suitable type of node which is able to allow user terminals or endpoints to access a packet-based network. For example, the media gateways each comprise a codec which is used to convert speech signals into digitised, packetised data suitable for transmission over the enterprise data network 1. In the example of FIG. 1 only one media gateway 1 is shown connected to enterprise network 1 for reasons of clarity. However, in practice, there is an increasing need for many media gateway nodes to be used. For example, each media gateway node may be located at a particular customer premises.

Several problems arise however when the number of media gateway nodes connected to enterprise network 1 increases. The present invention is concerned with both the recognition of those problems and providing means to address those problems.

The invention seeks to provide a method and apparatus for dealing with a plurality of access nodes in a private communications network which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to a first aspect of the present invention there is provided a node for representing a plurality of access nodes in a private communications network which is connected to a public communications network via an address translation node. The access nodes are arranged to facilitate a communications service provided from a service provider network which is connected to the public or common communications network.

The node is arranged to be connected in the private communications network such that it is intermediate between the address translation node on the one hand and the access nodes on the other hand.

The node is also arranged to receive in use at least some control signals from the service provider network and to forward those to one or more of the access nodes.

For example, the private communications network is an enterprise network comprising many media gateways. The enterprise receives services such as voice over internet protocol services from a service provider who has another private network containing a control node and other entities. The enterprise network is connected to a public network which is in turn connected to the service provider network.

By using a node, referred to herein as a media gateway multiplexer, to represent the access nodes in the enterprise network many advantages are achieved as explained in more detail below.

Preferably the media gateway multiplexer is arranged to receive in use at least some control signals from the access nodes and to forward those to the service provider network (as well as forwarding signals from the service provider network to the access nodes).

Preferably, each of the access nodes (e.g. media gateways) is arranged to support a plurality of endpoints (e.g. user terminals) and wherein the node comprises information about each of the access nodes and the associated endpoints.

Preferably the node comprises a processor arranged to modify address information in the control signals on the basis of the information about the endpoints, access nodes and information about the service provider network. In this way the media gateway multiplexer simply appears as an access node from the point of view of the service provider network.

In a preferred embodiment all control signals from the access nodes that are intended for the service provider network and all control signals from the service provider network that are intended for the access nodes are routed via the media gateway multiplexer. This provides the advantage that the node (media gateway multiplexer) provides a single point of contact by the service provider network for the access nodes. As a result only one bind is required at the address translation node for the single media gateway multiplexer, rather than one bind per access node.

In one example the node is integral with the address translation node. It is also possible that the node has a interface arranged to connect directly to the public communications network.

Advantageously the node is arranged to provide a secure connection between itself and the service provider network. This enables security to be provided in a simply and effective manner without the need to provide secure connections to each separate access node.

In a preferred embodiment the node comprises a processor arranged to generate control signals and to send those to one or more of the access nodes and/or the service provider network. This provides the advantage that the media gateway multiplexer is able to "anticipate" the responses or messages of the access nodes and/or control node and this speeds up processing and simplifies the procedures.

In one embodiment the processor is arranged to modify the control signals by adding information to enable one or more of the access nodes and the service provider network to communicate directly rather than via the node itself.

The invention also encompasses a communications network comprising:
  a private communications network connected to a public communications network via an address translation node;
  a service provider network connected to the public communications network;
  a plurality of access nodes in the private communications network;
  a node for representing the access nodes, said node being connected in the private communications network such that it is intermediate between the address translation node on the one hand and the access nodes on the other hand; said node being arranged to receive in use at least some control signals from the service provider network and to forward those to one or more of the access nodes.

According to another aspect of the present invention there is provided a method of representing a plurality of access nodes in a private communications network which is connected to a public communications network via an address translation node, said access nodes being arranged to facilitate a communications service provided from a service provider network which is connected to the public communications network, said method comprising the steps of:
  connecting a node in the private communications network such that it is intermediate between the address translation node on the one hand and the access nodes on the other hand;
  receiving control signals at the node from the service provider network and forwarding those to one or more of the access nodes.

The invention also encompasses a computer program stored on a computer readable medium and arranged to carry out any of the methods described immediately above.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
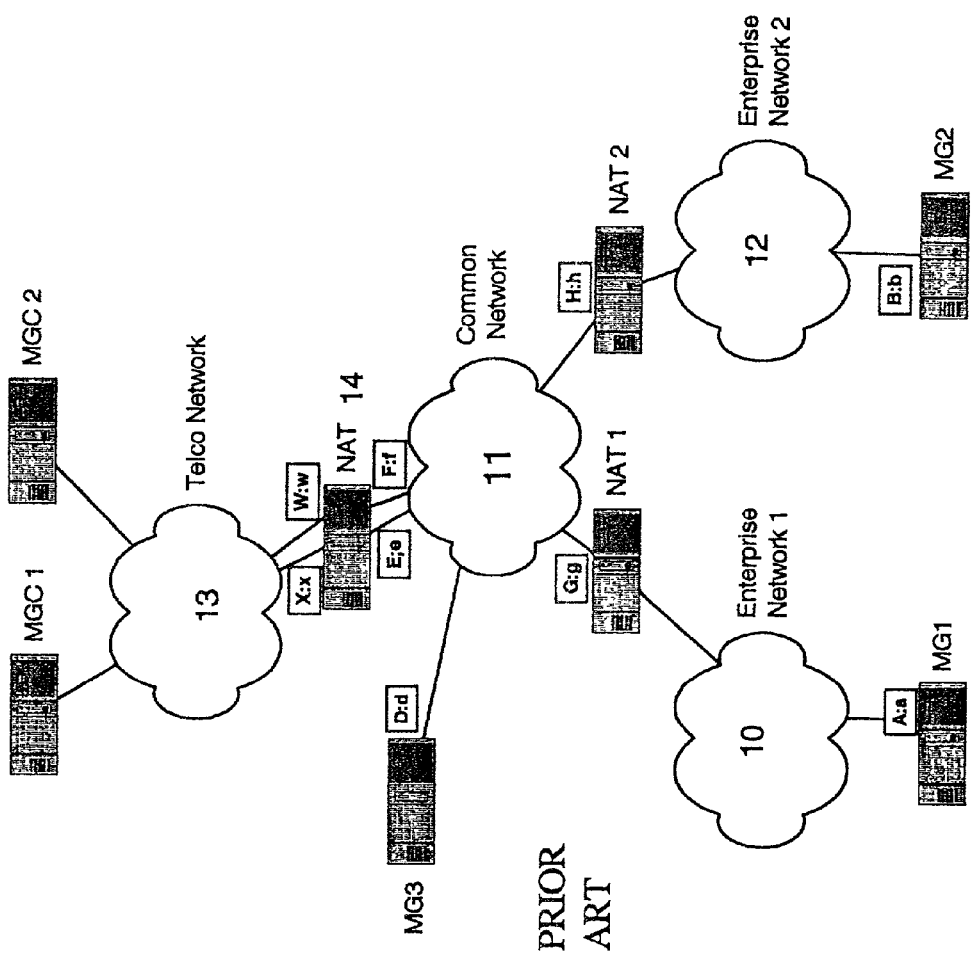
FIG. 1 is a schematic diagram of a communications network according to the prior art.

Embodiments of the present invention are described below by way of example only. These examples represent the best ways of putting the invention into practice that are currently known to the Applicant although they are not the only ways in which this could be achieved.

As mentioned above, problems arise as the number of media gateways connected behind an address translation node increases. This is illustrated schematically in FIG. 2 which shows a service provider's private network 23 connected to a public network 22 via a first address translation node 24. An enterprise network 20 (which is private) is also shown connected to the public network via a second address translation node 21. A control node 26 in the service provider's network 23 is used to provide services to users of the enterprise network 20 (for example, voice over internet protocol services) as known in the art.

Figure 2:
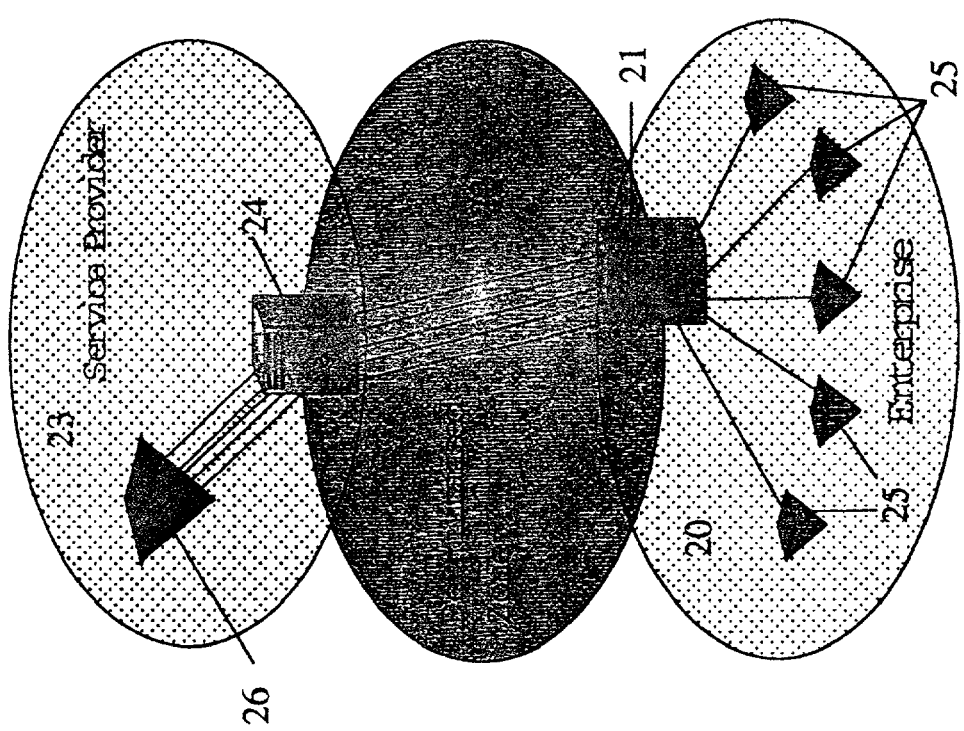
FIG. 2 is a schematic diagram of a communications network according to the prior art.

Several media gateway nodes 25 (or other suitable access nodes) are shown connected behind the second address translation node, which in this case is a NAT (NAT 2 in FIG. 2). For example, each of those media gateway nodes 25 may be located at a different customer premises and used to allow many user terminals to access the enterprise network 20.

As the number of media gateway nodes, or other access nodes connected behind NAT 2 increases several problems arise. For example, information about each media gateway node needs to be provided at the service provider's network 23 in order that the control node 26 can access this information and control communications accordingly. This information is typically pre-configured, provided during a registration process, or may be discovered by entities in the communications network itself. As the number of media gateway nodes increases this task increases in complexity and magnitude.

Similarly, when a media gateway is added or removed from the network information about this needs to be communicated to the service provider's network. This process involves control messages being sent between the enterprise and service provider networks. Thus as the number of media gateways being added or initialised increases the volume of traffic created by such control messages also increases. Also, traffic is required to decommission media gateways.

At present, in order to introduce a new media gateway or decommission one, both the enterprise network staff and the service provider staff are required. By using a media gateway multiplexer as described herein an enterprise is able to make changes to its network without the need to involve the service provider.

Each media gateway uses resources of the enterprise network (for example, NAT 2) and the service provider network (for example, the control node). This means that as the number of media gateways increases the amount of resources required grows and this puts pressure on the address translation nodes and the control node 26.

Another problem concerns the functionality that each media gateway provides. For example, if it is required to add new software to the media gateways (for example, to support a new signalling protocol) this needs to be done at each such node. As there are more media gateways this task increases in magnitude and complexity.

Another problem concerns security. Details of the enterprise network are known to the service provider network, for example, details of each of the media gateways 25. Also, some details of the enterprise network are visible to the public network 22. For example, each media gateway requires a control path to the service provider and that path is detectable by the public network. This gives the possibility that quantity information can be detected as well as behaviour.

As mentioned above address translation nodes are used to connect between the public network 22 and each of the private networks 23, 20. Consider an entity in the private enterprise network 20 which requires to communicate with an entity in the public network 22. Because the private entity does not have a public address visible to the entity in the public network, it is not possible for the public entity to contact the private entity directly. Instead this is typically achieved by setting up a binding at the address translation node NAT 2. The address translation node has a plurality of ports with associated public addresses and one of these is assigned for use by the particular private entity. Communications received at that port are then forwarded to the private entity. The binds that are created may either be static or temporary and in most preferred applications temporary binds are used. This is because the number of ports available at the NAT is limited and to use static binds would be expensive in terms of NAT port resources. Also, static binds can pose a security risk. However, in order to maintain temporary binds in place, heartbeat messages are sent from the appropriate media gateway of the enterprise network to the control node 26 of the service provider network 23. As the number of media gateway nodes 25 increases the number of heartbeat messages increases and this can lead to overloading of the control node 26 and the communications network itself. When the network does become overloaded there is a risk that the heartbeat messages will not get through and in that case the NAT bind expires. This is particularly problematic because then the particular media gateway cannot be reached until a new bind is set up.

Figure 3:
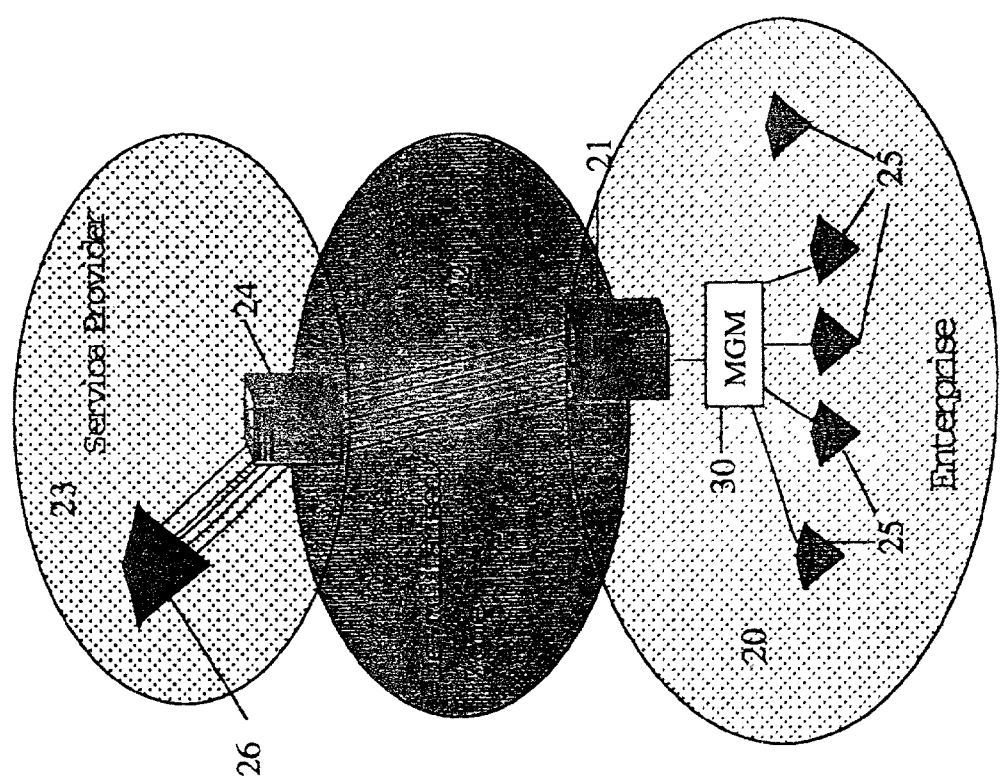
FIG. 3 is a schematic diagram of a communications network with a media gateway multiplexer.

In order to address these problems the present invention provides functionality in the enterprise network which from the service provider network appears as a single media gateway whilst representing all the media gateways in the enterprise network. This functionality is provided either as a separate entity or integrated into an existing node in the enterprise network. FIG. 3 illustrates the situation where the functionality is provided in a separate node. The functionality is hereinafter referred to as a media gateway multiplexer. However, this term is not intended to limit the invention to embodiments using media gateways. As explained any type of access nodes may be used which allow user terminals to access a packet-based communications network. Also, the term "multiplexer" is not used here in a strict technical sense. The media gateway multiplexer is any suitable functionality provided in a private address domain which gives a single point of contact for a plurality of access nodes in the private address domain. A control node in another address domain is then able to contact those access nodes by contacting the single point. The media gateway multiplexer acts as a mediator between the control node and the access nodes FIG. 3 is the same as FIG. 2 except that a media gateway multiplexer 30 is provided as a separate node connected behind NAT 2 and with each of the media gateways 25 connected to the media gateway multiplexer 30 rather than directly to NAT 2. These connections are shown schematically in FIG. 3 as direct connections, but that is not essential. For example, the connection between a media gateway 25 and the media gateway multiplexer 30 may traverse other network nodes that are not shown for reasons of clarity.

Figure 4:
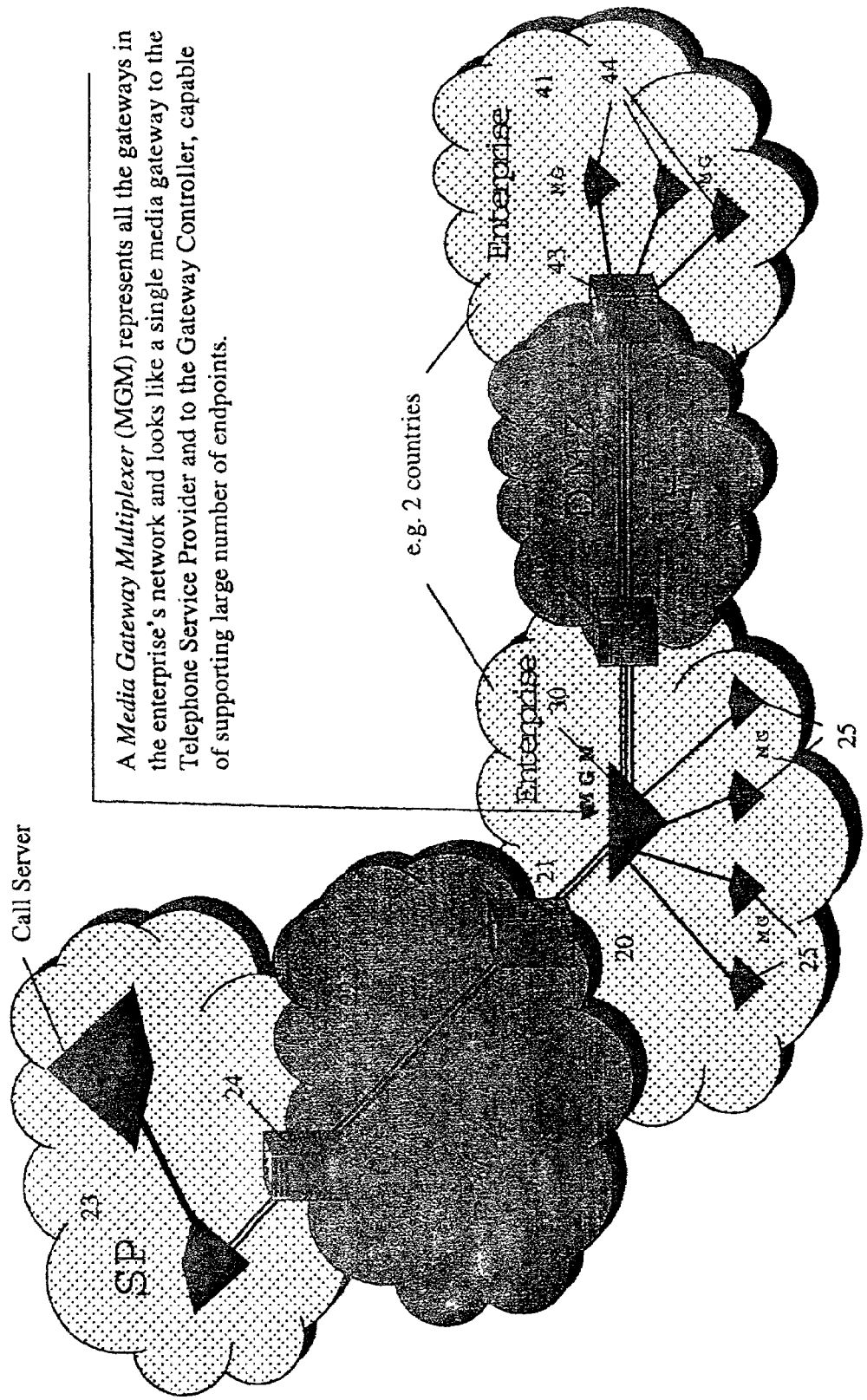
FIG. 4 is a schematic diagram of another communications network with a media gateway multiplexer.

As mentioned above, it is not essential for the media gateway multiplexer to be provided as a separate node 30 as in FIG. 3. Instead the media gateway multiplexer can be integrated into an address translation node (for example, NAT 2 of FIG. 3) or any other suitable node in the same address domain as at least some of the media gateways which it is required to represent. For example, FIG. 4 shows another arrangement where an enterprise has two networks 20, 41 which may be in different countries for example. These two networks 20, 41 are connected by a public network 40 via address translation nodes 42, 43 and further media gateways 44 are provided in the second enterprise network 41. The same reference numerals are used in FIGS. 2, 3 and 4 for the same components. In the example of FIG. 4 the media gateway multiplexer 30 represents not only the media gateways 25 of enterprise network 20 but also the media gateways 44 of enterprise network 41. It is also possible to use a second media gateway multiplexer, connected behind NAT 43 and which would represent media gateways 44.

A media gateway multiplexer has access to information about each of the media gateways that it supports and the endpoints supported by each of those media gateways. This information is either pre-configured at the media gateway multiplexer, is provided during a registration phase, or is actively discovered.

A media gateway multiplexer comprises processing capability to communicate control messages between the control node or other entities in a service provider network and itself. It also has processing capability to communicate with the media gateways it supports on the basis of the control messages received from the service provider network. This is achieved in any of a plurality of suitable ways each of which is suitable for particular applications or situations. For example, the media gateway multiplexer can act intelligently to effectively anticipate responses from the media gateways it supports and thus communicate with the service provider network more promptly and efficiently than would otherwise be the case. Alternatively, the media gateway multiplexer can act in a more basic manner, simply sending messages to the media gateways in response to requests from the service provider network and waiting for responses from the media gateways before taking further action. A range of different embodiments of the media gateway multiplexer are thus encompassed by the present invention. At one end of this range full "intelligence" is implemented at the media gateway multiplexer and at the other extreme no such "intelligence" is provided.

An embodiment in which the media gateway multiplexer has "intelligence" is now described with reference to the message sequence chart of FIG. 5. In this type of chart each vertical line represents an item in the communications network of FIG. 3 or another suitable communications network. The horizontal arrows between the vertical lines represent messages sent between the items in the communications network. The relative vertical positions of those arrows represents the chronological order of the messages with arrows further down the page being later in time.

Consider a situation where the media gateway 25 first comes into operation. At that stage, a registration process (see 56 in FIG. 5) occurs and in the prior art situation, each media gateway would need to send a control message to the control node 26 and receive an acknowledgement in return. However, in the present invention, instead of each media gateway needing to do this, only the media gateway multiplexer sends a registration message (see arrow 50 in FIG. 5) representing the terminations on one or more media gateways to address translation node 21 which forwards the message (see arrow 51 in FIG. 5) to the control node 26. In the meantime or later, each media gateway supported by the media gateway multiplexer sends a registration message (see arrow 52 in FIG. 5) to the media gateway multiplexer and receives an acknowledgement from that media gateway multiplexer (see arrow 54 in FIG. 5). Whilst this is going on, the control node 26 sends back an acknowledgement to the address translation node 21 (see arrow 53) and from there to the media gateway multiplexer (see arrow 55). This illustrates one way in which the media gateway multiplexer shows "intelligence". It is able to anticipate that message 52 will arrive from the media gateway and proceed to send message 50 towards the control node in advance. Similarly the media gateway multiplexer is able to send an acknowledgement (see message 54) to the media gateway before an acknowledgement (see message 55) is received back from the control node. From the point of view of the control node 26, the media gateway multiplexer 30 is acting as a conventional media gateway 25. This is because the messages between the media gateway multiplexer and the media gateways it supports (e.g. 52, 54) are effectively invisible to the control node 26. Thus the control node 26 is faced with a situation in which only one media gateway requires its interaction although that media gateway is in fact the media gateway multiplexer representing a plurality of media gateways 25.

Figure 5:
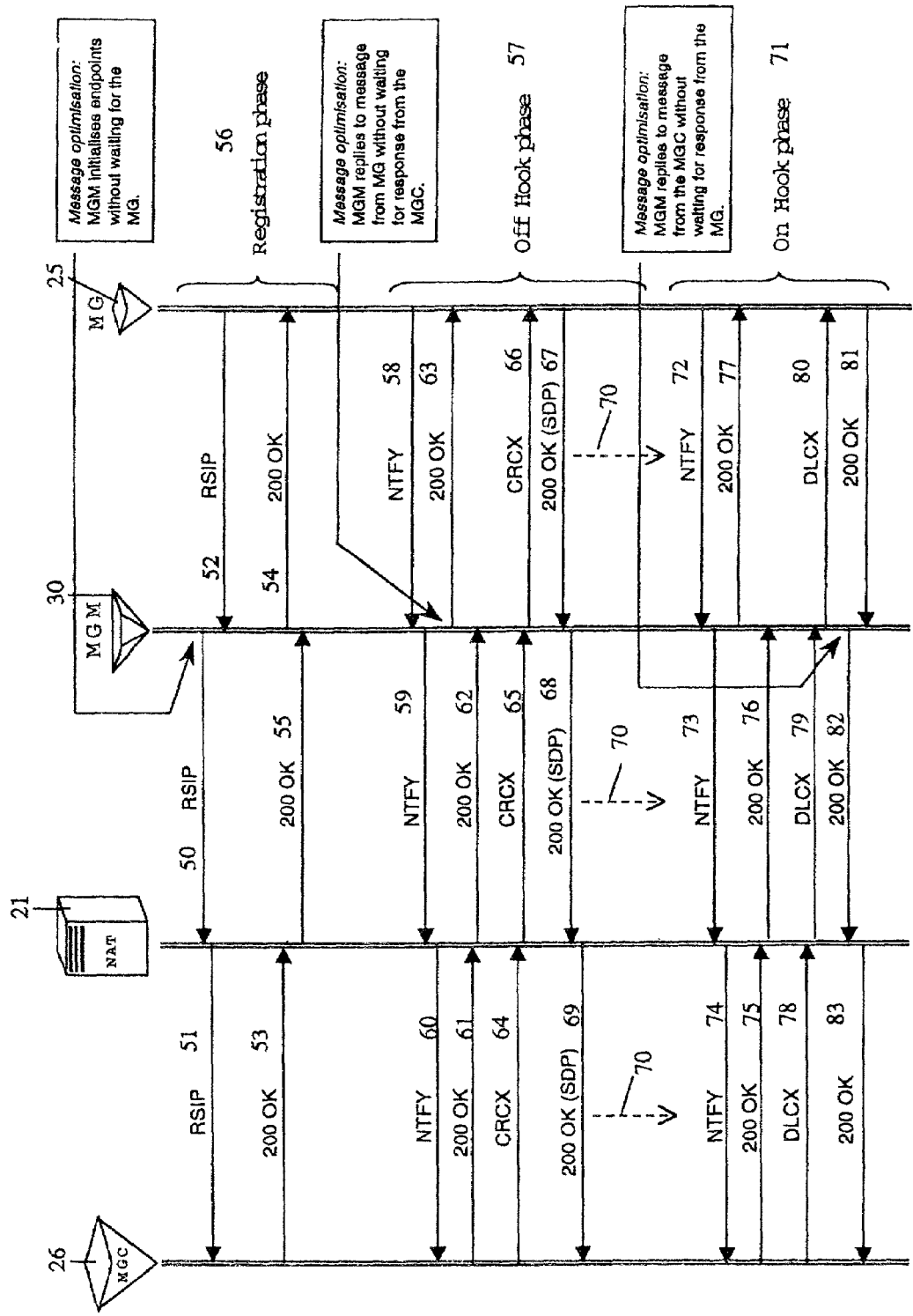
FIG. 5 is a message sequence chart of a method of carrying out a communication session using a media gateway multiplexer.

Consider another situation in which a user at a terminal stemming from one of the media gateways 25 makes an action such as "off hook" (see 57 in FIG. 5). In this situation the user is seeking to initiate a communication session such as a voice call, video call or any other suitable type of media session. The user terminal sends a notification message to its associated media gateway (or other access node) which in turn sends a notification message (see arrow 58 in FIG. 5) to the media gateway multiplexer 30. Using its "intelligence" the media gateway multiplexer is able to reply straight away to that notification message by sending an acknowledgement (see arrow 63) back to the media gateway 25 without waiting to receive an acknowledgement from the control node 26. In the meantime the media gateway multiplexer 30 forwards the notification message to the control node 26 via an address translation node 21 (see messages 59 and 60). The control node 26 sends back an acknowledgement via the address translation node (see messages 61 and 62).

The control node 26 then issues a create connection (CRCX) message to the media gateway via the address translation node and the media gateway multiplexer (see messages 64, 65 and 66 in FIG. 5). It is possible for the media gateway multiplexer to anticipate again here and send the crcx message before it receives that from the control node. However this is not essential and is not shown in FIG. 5.

The media gateway 25 next sends messages back to the control node 26 via the media gateway multiplexer and the address translation node (see arrows 67, 68 and 69 of FIG. 5). The communication session then proceeds as known in the art and this stage is indicated by the dotted arrows 70 in FIG. 5.

At the end of the communication session an "on hook" phase occurs (see 71 in FIG. 5). The end user makes an action to terminate the communication session and a notification message is sent to the media gateway 25 and from there to the media gateway multiplexer (see arrow 72 in FIG. 5). Using its "intelligence" the media gateway multiplexer is able to respond straight away by sending an acknowledgement 77 to the media gateway 25. In the meantime the media gateway multiplexer forwards the notification message to the control node via the address translation node (see 73 and 74 in FIG. 5) and acknowledgement messages are sent back (see 75 and 76). A delete connection message (DLCX) is then issued by the control node and sent to the media gateway (see 78, 79, 80 in FIG. 5). Using its "intelligence" the media gateway multiplexer replies to the DLCX message by sending message 82 to the address translation node and from there to the control node (see 83). This is done before the media gateway multiplexer receives an acknowledgement back from the media gateway to say that the connection has been successfully received (see 81 in FIG. 5). It is also possible for the DLCX message to be anticipated by the media gateway multiplexer.

In another embodiment the media gateway multiplexer has no "intelligence" and simply acts as a "go between". This is illustrated with reference to FIG. 6 which is also a message sequence chart. The same reference numerals are used in FIGS. 5 and 6 for the same items.

Figure 6:
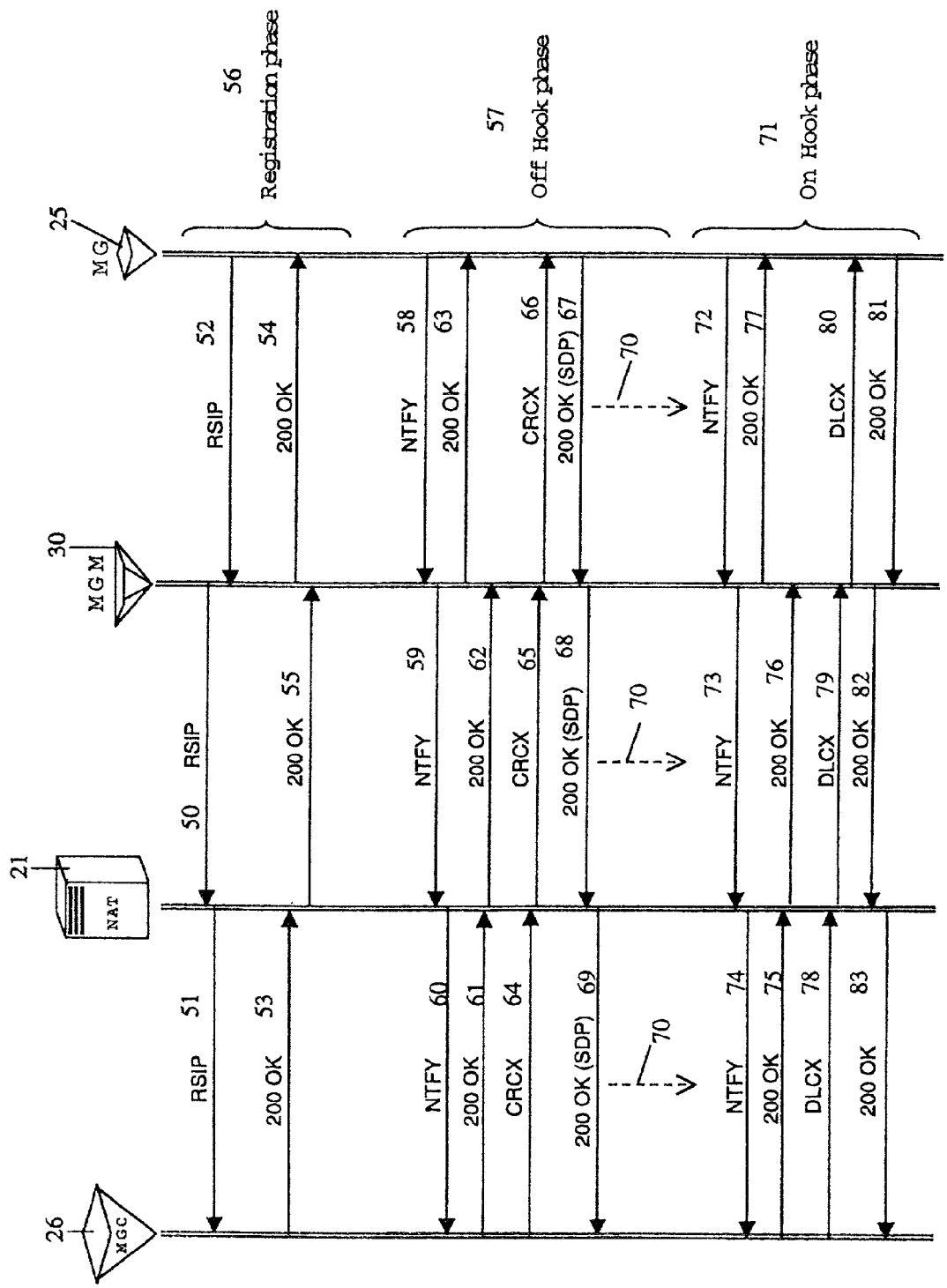
FIG. 6 is a message sequence chart of another method of carrying out a communication session using a media gateway multiplexer.

In the example of FIG. 6 it can be seen that the media gateway multiplexer does not anticipate responses from either the media gateway or the control node as was the case in FIG. 5. For example, the media gateway waits to receive message 52 from the media gateway before sending registration message 50 to the address translation node. Similarly the media gateway multiplexer waits to receive acknowledgement message 62 before sending acknowledgement 63 to the media gateway. This continues throughout the message sequence of FIG. 6. Thus in this example, the media gateway multiplexer still performs the function of "hiding" the media gateways it supports from the view of the control node. This is achieved in both the methods of FIGS. 5 and 6 by effectively preventing the control node or address translation node from sending communications directly to the media gateways. Rather all such communications are intercepted by the media gateway multiplexer. Also, in the embodiment of FIG. 6 no anticipation of messages is done at the media gateway multiplexer unlike the situation in FIG. 5.

Another embodiment is described with reference to FIG. 7 which is again a message sequence chart. However in this example, the control node is able to send communications directly to the media gateways without those messages being intercepted by the media gateway multiplexer. Despite this the media gateway multiplexer still performs its function of "hiding" the media gateways from the view of the control node. This is achieved by enabling the media gateway multiplexer to alter the messages it intercepts. This means that fewer messages pass though the media gateway multiplexer itself than in the embodiments of FIGS. 5 and 6. However, the media gateway multiplexer must take an active role in modifying messages that it receives as appropriate.

As in FIGS. 5 and 6 a registration phase 96 occurs in order to register new media gateways at the control node. The media gateway 25 sends a registration message 90 to the media gateway multiplexer which forwards that to the address translation node 21 and from there to the control node. However, the media gateway multiplexer alters the address details of the originator in the message such that the control node will "think" that the registration message was sent from the media gateway multiplexer.

Figure 7:
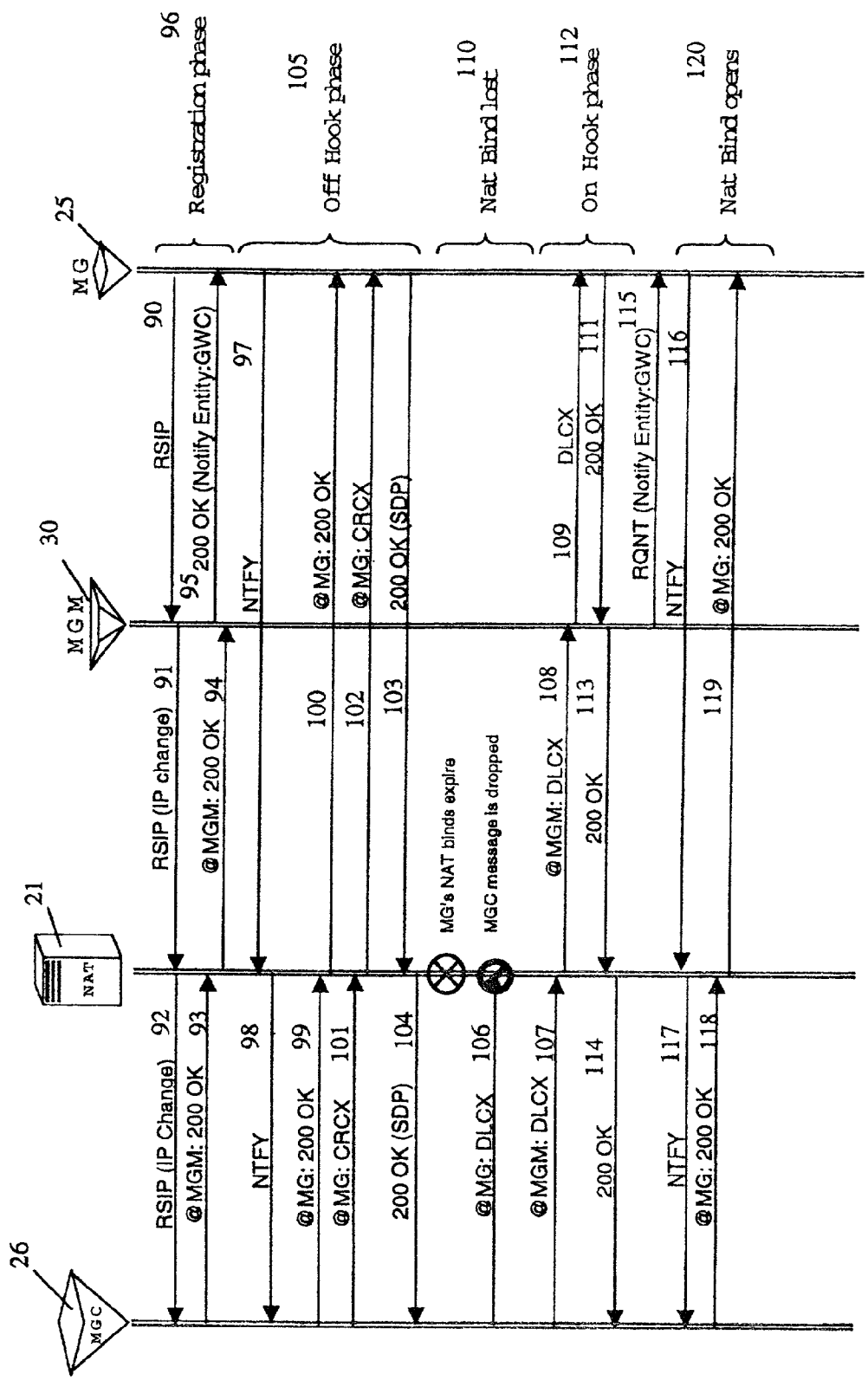
FIG. 7 is a message sequence chart of another method of carrying out a communication session using a media gateway multiplexer.

An acknowledgement message is sent back from the control node to the media gateway multiplexer via the address translation node (see 93 and 94 in FIG. 7). However, in advance of receiving that acknowledgement message 94, the media gateway multiplexer sends a modified acknowledgement message 95 to the media gateway. This modified acknowledgement message 95 comprises details of the address of the control node which needs to be notified to initiate a communication session. That address information is added to the message by the media gateway multiplexer. The media gateway multiplexer knows that information because it has previously registered with the control node itself or been provisioned.

During the "off hook" stage, when a user requires to initiate a communication session, a notification message is sent from the media gateway direct to the control node (via a binding which has been set up at the address translation node as known in the art). This is shown by messages 97 and 98 in FIG. 7. This is an example of a message that is not intercepted by the media gateway multiplexer. Communications then proceed between the control node and the media gateway via the address translation node but bypassing the media gateway multiplexer (see messages 99, 100, 101, 102, 103 and 104). A connection is successfully established and media packets flow (see 103 and 104). However, consider the situation that the bind at the address translation node expires as illustrated in FIG. 7. For example, this could be because heartbeat messages were not sent or did not successfully reach the control node. The control node attempts to send a message to the media gateway through the now expired NAT bind—in this case it is the DLCX message (106). When no reply is received within a provisioned or specified timeout period, and following any protocol specified retries, the control node realises that the bind has expired and sends the message via the address translation node to the media gateway multiplexer (see 107 and 108). The media gateway multiplexer issues its own delete connection message 109 to the media gateway. Acknowledgement messages are then sent back (see 111, 113, 114).

A new bind at the address translation node is then created for the required communication session as known in the art. The media gateway multiplexer informs the media gateway of this (see message 115) and tells the media gateway the public address to use at the address translation node in order for the communication session to proceed. Notification messages are then sent (116, 117) and acknowledgement messages (118, 119) in a similar way to messages 97, 98, 99 and 100 and the method proceeds as before in order to set up the communication session.

Thus in the example of FIG. 7 the media gateway multiplexer intervenes in the case that there is a problem, such as the bind expiring at the address translation node. However, apart from that the media gateway multiplexer intercepts relatively few messages as compared with the examples in FIGS. 5 and 6.

A range of embodiments thus exists, comprising the three examples in FIGS. 5, 6 and 7 and also combinations of different ones of those methods at different stages of a communication session. In addition, an enterprise network with many media gateways is able to set different levels of support for each of the media gateways. For example, a first group of media gateways might specify at the media gateway multiplexer that they require full support as in FIG. 5, whilst the other media gateways only require minimum support as in FIG. 7. This may also be specified by the controller, or by any other node in the network including the provisioning system. It may also be decided on autonomously by the media gateway in the multiplexer.

A particular embodiment will be suited to particular customer or network specific requirements. For example, the embodiment of FIG. 7 is particularly suited to situations where there are many media gateways and the number of heartbeat message will be a problem whereas the embodiments of FIGS. 5 and 6 are suited for situations where the anonymity of the enterprise is paramount.

In all of the embodiments described with reference to FIGS. 5 to 7 it can be seen that the media gateway multiplexer acts as a mediator between the service provider network and the media gateways in the enterprise network. This mediation role is in respect of signalling messages between the service provider network and the media gateways; media messages are unaffected. Also, the media gateway multiplexer provides a single point of contact in the enterprise network for the media gateways in that network (i.e. which have no public addresses). This is advantageous because only one bind at the address translation node or a single public address is needed to control all the media gateways in the enterprise network. This frees up resources at the address translation node and reduces the number of public addresses needed. Also, resources at the service provider network are freed up because the control node only needs to maintain details of a single contact point in the enterprise network rather than many contact points. In addition, configuration of the media gateways at the enterprise network is simplified despite large numbers of media gateways being used.

Another advantage relates to security. The signalling path between the control node and the media gateway multiplexer is easily arranged to be secure using known methods. This means that signalling between the control node and each of the media gateways supported by the media gateway multiplexer is also secure. This is achieved by using a media gateway multiplexer with appropriate security functionality and without the need to upgrade each media gateway in order that they all support secure connections. Similarly, new protocols and services can be quickly and easily implemented at the media gateway multiplexer without the need to make changes at each of the supported media gateways. That is, the enterprise is able to use media gateways that operate different protocols than the control node of the service provider network.

Because the media gateway multiplexer can be used to represent all the media gateways in the enterprise network, it is possible for an enterprise to hide the actual number and names of its media gateways from the view of the service provider. This improves security. Also, if changes to the network topology or equipment occurs in the enterprise network the service provider does not need to be informed. Because the service provider has access to the single point of contact at the media gateway multiplexer it is still able to communicate with the media gateways despite topology and equipment changes.

The examples described above also illustrate how the use of a media gateway multiplexer enables the amount of network traffic to be reduced. For example, consider a situation in which the control node needs to contact all the media gateways. Instead of sending separate messages to each media gateway a single message is sent to the media gateway multiplexer which then contacts each media gateway. Similarly, if many media gateways need to contact the control node, messages from those media gateways are merged into a single response which is sent from the media gateway multiplexer. For example, this would occur after a power outage when all the media gateways try to register at once when the power is restored.

Traffic caused by heartbeat messages is also reduced. As mentioned above, heartbeat messages have previously been sent from media gateways to the control node for each bind which it is required to maintain. When using a media gateway multiplexer only one bind is needed and so only one heartbeat message needs to be sent from the media gateway multiplexer per protocol. Also, in one embodiment it is possible to avoid the need for heartbeat messages altogether. In that case, the media gateway multiplexer itself has a public interface (for example, it is integrated into the NAT). NAT binds can then be opened on a per call basis without the need to maintain temporary binds. Another option would be to provide static binds at the media gateway multiplexer.

A particular advantage of the present invention is that media gateways are always reachable through the media gateway multiplexer even when their own NAT binds have expired. This is illustrated in the embodiment described above with reference to FIG. 7. In that case the media gateway is able to communicate directly with the control node at some stages of the message sequence. However, when the NAT bind for that media gateway expires this is no longer possible. Instead the control node is able to reach the media gateway via the media gateway multiplexer. In the prior art situation, without a media gateway multiplexer, a new NAT bind would need to be established from the media gateway before the communication could continue.

In summary, the media gateway multiplexer can be considered as providing several types of functions. Address translation functions, media gateway functions, control node functions and protocol translation functions. These are now detailed:

Address Translation Functions

When the media gateway multiplexer receives a message that it decides to forward it is able to change the destination and source addresses of that message. In this respect it acts as an address translation node. For example, consider the case in which a message is received from a media gateway, (say message 58 of FIG. 5). The media gateway multiplexer changes the destination address to the address of the control node and the source address to the address of the media gateway multiplexer itself. Once these changes have been made the message is forwarded (see 59 and 60 in FIG. 5).

A similar process occurs if the media gateway multiplexer receives a message from the control node. For example, consider message 65 in FIG. 5. The media gateway multiplexer looks into this message to retrieve the endpoint information. It then scans an endpoint database to determine which media gateway the message is to be sent to. (The media gateway multiplexer has access to information about all the media gateways it supports and the endpoints associated with each of those media gateways.) Next the destination address is changed to the media gateway's address and the source address is changed to the address of the media gateway itself.

Media Gateway Functions of the Media Gateway Multiplexer

From the control node's perspective the media gateway multiplexer is a media gateway with a large number of supported endpoints or lines. In this respect the media gateway multiplexer performs media gateway type functions. These include:

Reporting to the control node all the endpoints supported by the media gateway multiplexer. This is done during initialisation or restart. The media gateway multiplexer is able to report to the control node before receiving reports from the media gateways as described above with reference to FIG. 5.

Sending heartbeat messages to the control node to keep binds at the address translation node open.

Communicating with the control node. This includes for example, receiving messages from the control node and either replying to these straight away using media gateway "intelligence" or forwarding them to the appropriate media gateways. Also, replies are sent from the media gateway multiplexer to requests received from the control node.

Control Node Functions of the Media Gateway Multiplexer

From the point of view of media gateways supported by the media gateway multiplexer, control node functions are provided by the media gateway multiplexer itself. That is, the media gateway multiplexer communicates with the media gateways in a similar way that a control node would. For example, the media gateway multiplexer replies to messages sent by the media gateways to report their endpoints during initialisation or restart. The media gateway multiplexer receives messages from the media gateways and either forwards those to the control node or waits for similar messages from other media gateways, merges those messages and forwards the merged message to the control node. Alternatively, the media gateway multiplexer can reply to messages received from the media gateways using its "intelligence".

The media gateway multiplexer is also able to forward messages from the control node to the appropriate media gateway. As well as this it can replicate messages from the control node regarding a set of endpoints and forward them to all the appropriate media gateways.

Protocol Translation Functions of the Media Gateway Multiplexer

Media gateways are able to communicate with the control node and the media gateway multiplexer and in addition with other nodes in the communications network. In order to do this the media gateways use various signalling protocols such as H.248 or MGCP. The media gateway multiplexer is thus advantageously arranged to support a plurality of different signalling protocols in order to accommodate different types of media gateway.

The media gateway multiplexer is then able to use one protocol to communicate with a media gateway and another protocol to communicate with the control node. In this way the media gateway multiplexer acts as a protocol translator, translating from one protocol to another.

Fallback Gateway Functions of Media Gateway Multiplexer

Consider the situation when a media gateway is unreachable by the control node because the bind at the address translation node has expired. This situation was discussed above with reference to FIG. 7.

In the example of FIG. 7 a connection between the control node and media gateway was re-established. However, another option is to change the level of support from minimum (FIG. 7) to full (FIG. 5) which will cause all messages to be sent via the media gateway multiplexer.

Either of these two methods can be used depending on whether the control node is aware of the functionality of the media gateway multiplexer. In the example of FIG. 7 the control node is aware of the capabilities of the media gateway multiplexer and so uses the media gateway multiplexer to re-establish the connection. However, in some embodiments the control node is unaware of the capabilities of the media gateway multiplexer. In those cases the media gateway multiplexer appears as a media gateway to the control node. Then the control node will use the media gateway multiplexer as an alternative route to reach the media gateway and the full support method of FIG. 5 is followed.

The invention claimed is:

1. A node for representing a plurality of access nodes in a private communications network which is connected to a public communications network via an address translation node, said access nodes being arranged to facilitate a communications service provided from a service provider network which is connected to the public communications network, said node being arranged to be connected in the private communications network such that it is intermediate between the address translation node on the one hand and the access nodes on the other hand and requiring only a single bind in the address translation node;

said node being arranged to receive in use at least some control signals from the service provider network and to forward those to one or more of the access nodes.

2. The node as claimed in claim 1 which is further arranged to receive in use at least some control signals from the access nodes and to forward those to the service provider network.

3. The node as claimed in claim 1 wherein each of the access nodes is arranged to support a plurality of endpoints and wherein the node comprises information about each of the access nodes and the associated endpoints.

4. The node as claimed in claim 3 which comprises a processor arranged to modify address information in the control signals on the basis of the information about the endpoints, access nodes and information about the service provider network.

5. The node as claimed in claim 2 which is arranged to receive all control signals from the access nodes that are intended for the service provider network and all control signals from the service provider network that are intended for the access nodes.

6. The node as claimed in claim 1 which provides a single point of contact by the service provider network for the access nodes.

7. The node as claimed in claim 1 which is integral with the address translation node.

8. The node as claimed in claim 1 which has an interface arranged to connect directly to the public communications network.

9. The node as claimed in claim 1 which is arranged to provide a secure connection between itself and the service provider network.

10. The node as claimed in claim 1 which comprises a processor arranged to generate control signals and to send those to one or more of the access nodes and/or the service provider network.

11. The node as claimed in claim 10 wherein the processor is arranged to send the generated control signals in anticipation of control signals received from either one or more access nodes or the service provider network.

12. The node as claimed in claim 1 which comprises a processor arranged to modify the control signals by adding information to enable one or more of the access nodes and the service provider network to communicate directly rather than via the node itself.

13. A communications network comprising a node as claimed in claim 1.

14. A communications network comprising:
a) a private communications network connected to a public communications network via an address translation node;
b) a service provider network connected to the public communications network;
c) a plurality of access nodes in the private communications network;
d) a node for representing the access nodes, said node being connected in the private communications network such that it is intermediate between the address translation node on the one hand and the access nodes on the other hand and requiring only a single bind in the address translation node; said node being arranged to receive in use at least some control signals from the service provider network and to forward those to one or more of the access nodes.

15. A method of representing a plurality of access nodes in a private communications network which is connected to a public communications network via an address translation node, said access nodes being arranged to facilitate a communications service provided from a service provider network which is connected to the public communications network, said method comprising the steps of:
a) connecting a node in the private communications network such that it is intermediate between the address translation node on the one hand and the access nodes on the other hand and providing said node with only a single bind in the address translation node;
b) receiving control signals at the node from the service provider network and forwarding those to one or more of the access nodes.

16. A computer program stored on a computer readable medium and arranged to carry out the method of claim 15.

* * * * *